May 23, 1939.  J. A. VORIS  2,159,730

MEAT-SCORING MACHINE

Filed April 6, 1936  2 Sheets-Sheet 1

INVENTOR.
John A. Voris
BY Fred C. Matheny
ATTORNEY

May 23, 1939.　　　　　J. A. VORIS　　　　　2,159,730
MEAT-SCORING MACHINE
Filed April 6, 1936　　　　　2 Sheets-Sheet 2
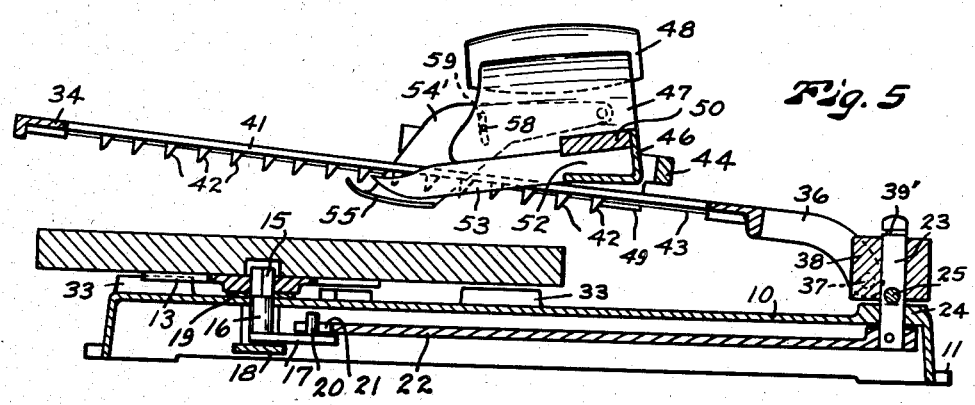
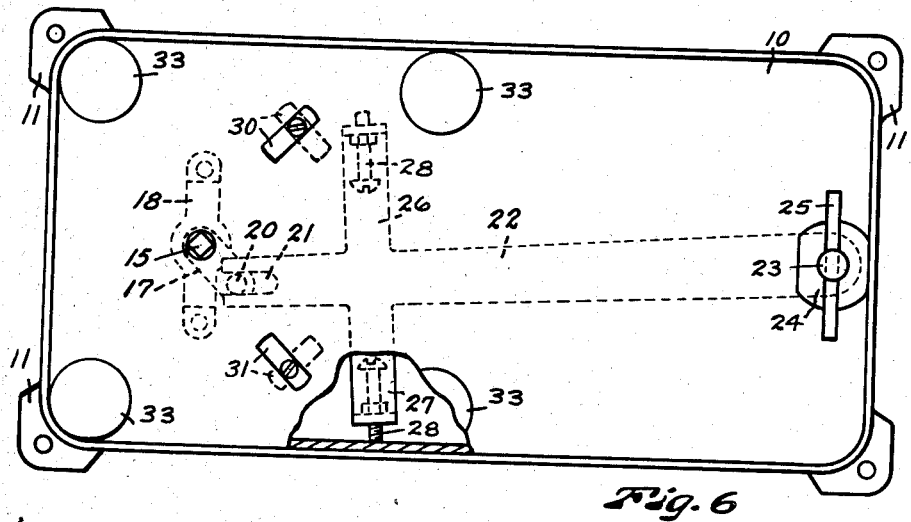
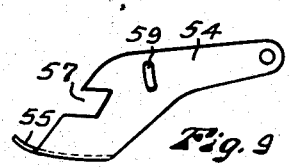
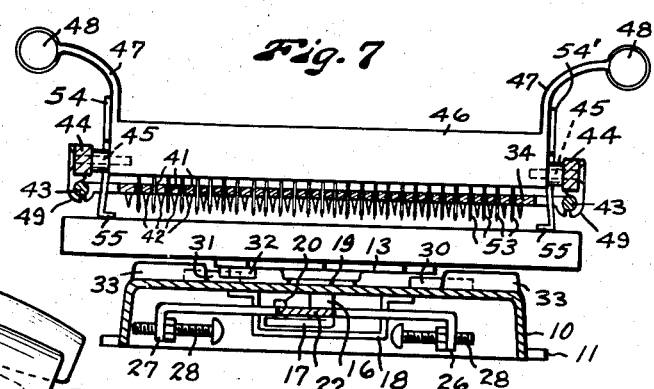
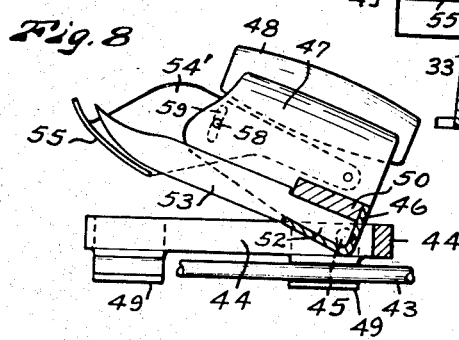
INVENTOR.
John A. Voris
BY
Fred C. Matheny
ATTORNEYS.

Patented May 23, 1939

2,159,730

UNITED STATES PATENT OFFICE 2,159,730

MEAT-SCORING MACHINE

John A. Voris, Kirkland, Wash.; E. A. Voris administrator of John A. Voris, deceased Application April 6, 1936, Serial No. 72,904

9 Claims. (Cl. 17—25)

This invention relates to a meat scoring machine of a type adapted to be used for scoring and tendering sliced meat preparatory to cooking the same.

A primary object of this invention is to provide a meat scoring machine which is simple in construction, not expensive to manufacture and rapid and efficient in use.

Another object of the invention is to provide a meat scoring machine having a rotatively mounted horizontal meat supporting turn table angularly movable through a substantial angle so as to present a piece of meat for scoring, by a set of movable knives, in two directions at an angle to each other.

A further object is to provide a meat scoring machine having a spiked and slotted meat holding plate pivotally mounted for vertical and horizontal swinging movement relative to an angularly movable horizontal turn table and to provide means connecting the meat holding plate and the turn table for angularly moving the turn table in response to horizontal sidewise swinging movement of the meat holding plate.

Another object of the invention is to provide a meat scoring device embodying a knife carriage having a plurality of knives adapted to be pushed through a piece of meat by a forward and downward pressure exerted manually directly on the carriage.

Another object of the invention is to provide a meat scoring machine in which the several parts are very quickly and easily dis-assembled for the purpose of cleaning and sterilizing and are as quickly re-assembled for use.

Another object is to provide a meat scoring machine having a knife carriage mounted for movement longitudinally of a meat holding plate on track rods provided on the plate, said knife carriage having a plurality of knives securely held in a slotted metal cross bar and said knife carriage further having novel means for permitting adjustment of the knives to compensate for wear and means for permitting automatic adjustment of the knives for scoring pieces of meat of different thickness.

Other and more specific objects of the invention will be apparent from the following description taken in connection with the accompanying drawings.

In the drawings Fig. 1 is a plan view of a meat scoring machine constructed in accordance with this invention.

Fig. 5 is a sectional view substantially on broken line 5—5 of Fig. 1, showing the meat engaging plate and knives elevated a short distance above the meat supporting turn table.

Fig. 6 is a plan view, with parts broken away and other parts shown by dotted lines, of the base of the machine, the meat supporting turn table, meat holding plate and knife carriage being removed.

Fig. 7 is a cross sectional view substantially on broken line 7—7 of Fig. 1.

Fig. 8 is a detached sectional view of a knife carriage and fragments of a supporting mechanism therefor, the knives being shown in raised position.

Fig. 9 is a detached elevation of a shoe member embodied in the invention.

Like reference numerals designate like parts throughout the several views.

Figure 1:
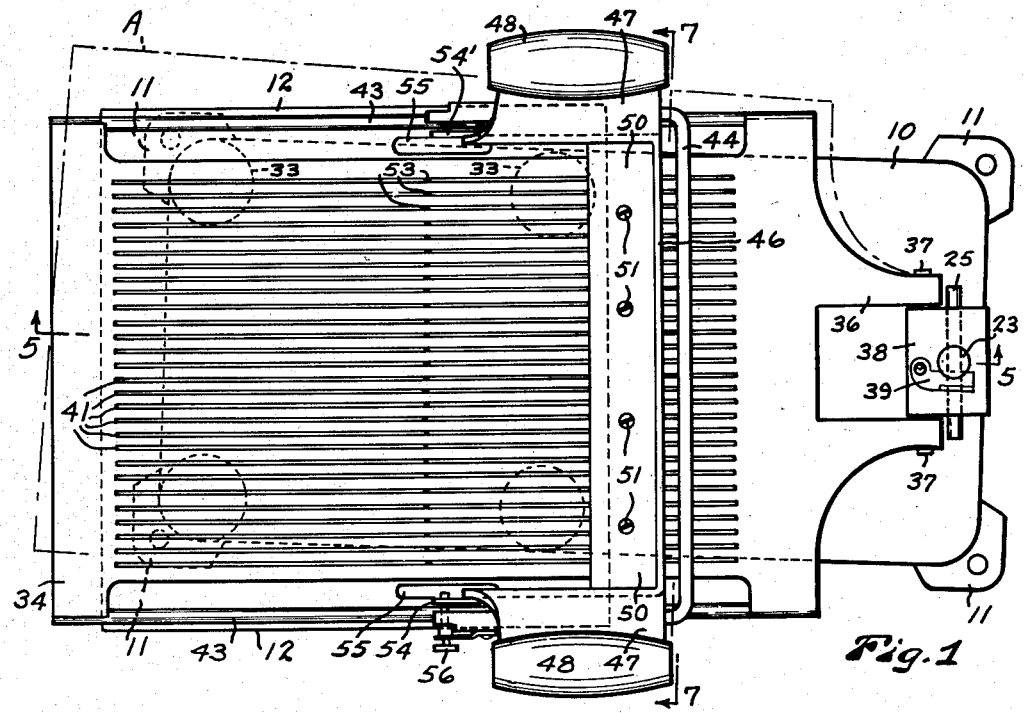

Referring to the drawings, 10 designates a rectangular base of inverted dish shape provided at the corners with lugs 11 by which it may be secured to any suitable horizontal support to hold said base immovable.

A normally horizontal meat supporting turn table 12 is mounted on the base 10 near one end thereof.

Figure 4:
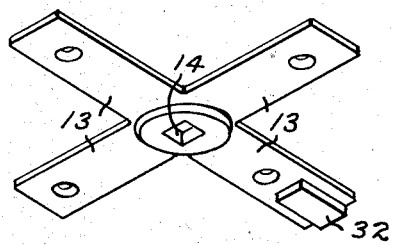
Fig. 4 is a detached perspective view of a turn table bracket embodied in the invention.

The supporting means for the turn table 12 preferably comprises a metal bracket 13 in the shape of a cross, see Fig. 4, secured to the bottom of the turn table 12 and having a socket 14 therein for the reception of an upwardly protruding end 15 of a shank 16. The socket 14 and end 15 are preferably of square cross section or of such other shape as to prevent relative turning movement between the bracket 13 and the member 15. The lower end of the shank 16 has a rigidly connected crank arm 17 thereon. The weight or load of the turn table is supported on a washer 19 which rests on the base 10. The shank member 15—16—17 is supported by a bracket or hanger 18, see Figs. 5 and 7, which is secured to the base 10. The crank arm 17 has a crank pin 20 extending upwardly therefrom into a slot 21 in a lever arm 22. The lever arm 22 extends from the crank arm 17 to a point near the opposite end of the base 10 and is secured to an upright post 23. The post 23 extends upwardly through a bearing 24 in the base 10 and projects above said base. A cross pin 25 extends through the post 23 immediately above the bearing 24. The lever arm 22 is provided near the forward end with two stop arms 26 and 27 which project in opposite directions therefrom and have adjustable stop screws 28 in their end portions. The stop screws 28 limit the swinging movement of the lever arm 22 by engagement with the sides of the base 10. Additional stop means for the meat supporting turn table 12 is provided in the form of two preferably adjustable stop lugs 30 and 31 on the top of the base 10 positioned to be engaged by a member 32 on one arm of the cross bracket 13.

Four bosses 33 are provided on the top of the base 10 in suitable positions to form supports with which one or more of the four corners of the turn table 12 may engage when downward pressure is exerted on said turn table at any point removed from the vertical axis of rotation of said table. When no unbalanced downward pressure is being exerted on the turn table 12 it will be clear of the bosses 33 and will turn freely. When a downward pressure is being exerted on said turn table at a location removed from the axis of rotation of said turn table then one or more corners of said turn table may be depressed onto one or more of said bosses 33, thus relieving the pivot means 15—16 of strain and at the same time providing a firm support for the turn table 12. The turn table 12 is quickly and easily removable from the upright pivot means 15—16 for the purpose of cleaning and sterilizing. A slight amount of play is desirable between the socket 14 and shank portion 15 to permit easy removal of the turn table 12. The bosses 33 make it possible to provide this play and yet always maintain the turn table substantially horizontal. The weight of a piece of meat on the turn table will usually be evenly enough distributed so that the turn table will rest squarely on the washer 19 and will not be depressed into contact with any of the bosses 33 while it is being moved angularly with meat supported thereon.

Figure 2:
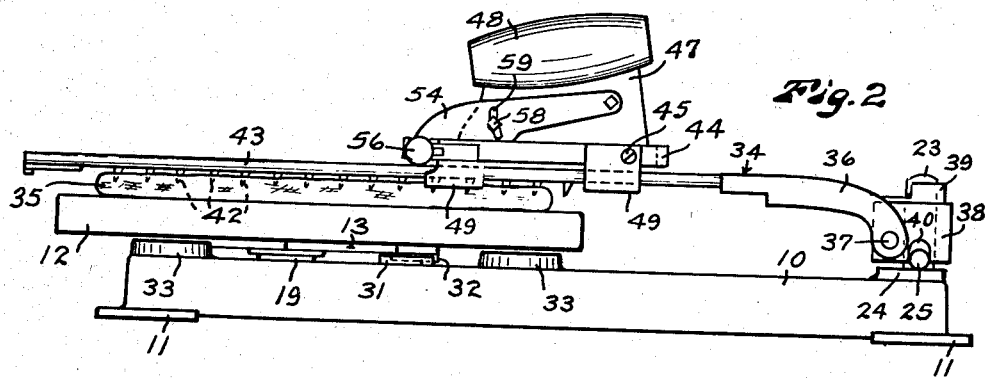
Fig. 2 is a side elevation of the same.

A meat holding plate 34 is movable toward and away from the turn table into and out of engagement with a piece of meat 35, see Fig. 2, which may be supported on said turn table. One end of the meat holding plate 34 is provided with bracket means 36 which is connected by horizontal pivot means 37 with a block 38. The block 38 has a suitable bore which fits over the post 23. The bottom of said block is provided with notches 40 which fit over the cross pin 25. A readily releasable latch member 39 on the block 38 is arranged to engage within a notch 39' on the post 23 and releasably secure the block 38 to the post 23.

The meat holding plate 34 is provided with a plurality of longitudinally extending parallel slots 41. A plurality of pointed meat holding prongs 42 are provided on the bottom or meat contacting side of the meat holding plate 34. Two parallel track bars 43 are provided on opposite edges of the meat holding plate 34. A channel-shaped knife carriage support 44 is slidably mounted on the track bars 43 by means of downwardly extending grooved track bar engaging members 49, see Figs. 2, 7 and 8. A knife carriage is connected by pivot means 45 with the side arms of the support 44. The knife carriage preferably consists of a transverse bar member 46 of angle-shaped cross section having curved extensions 47 at both ends which extend upwardly and outwardly and terminate in handle portions 48. A knife holding bar 50 is positioned within the angle-shaped bar member 46 and secured thereto as by screws 51. The knife holding bar 50 is slotted for receiving and holding the end portions 52 of a plurality of knives 53. The knives 53 are spaced to conform to the spacing of the slots 41 and said knives extend forwardly from the bar 50 and, when they are in operative position for scoring, extend downwardly through the slots 41.

Two plate members 54 and 54' are secured to the respective extensions 47 of the carriage bar 46 and extend downwardly between the edges of the meat holding plate 34 and the adjacent track bars 43. A shoe member 55 is provided on the lower portion of each plate member 54. The shoe members 55 are adapted to engage with the turn table 12 to limit the downward movement of the knives 53. When the knives are in their lowermost position and the knife carriage is moved lengthwise of the meat holding plate 34 the shoe members 55 will slide on the turn table 12 and support the knives 53 so that their cutting edges are very close to the turn table 12 but do not engage with said turn table 12. Preferably bolts or screws 58 operable in slots 59 in the plate members 54 are used to secure the plate members 54 to the extensions 47 in such a manner that the plate members 54—54' and shoes 55 may be adjusted to compensate for wear on the knives. A spring-pressed latch member 56 connected with a side bar of the knife carriage support 44 is adapted to project into a notch 57 of larger size than the latch member 56 in the plate member 54'. When the latch member 56 is retracted from the notch 57 the knife carriage may be swung upwardly on the pivot means 45 so as to raise the knives 53 out of the slots 41, as shown in Fig. 8. Said knife carriage may then be moved forwardly as respects the meat holding plate 34 until the grooved track bar engaging members 49 slide off of the forward ends of the track bars 43, leaving the knife carriage completely disengaged from the meat holding plate 34. This facilitates more efficient cleaning and sterilization of the knife carriage assembly and the meat holding plate. It will be noted that the track bars 43 are secured to the meat holding plate 34 at their forward ends, in such a manner that the track bar engaging members 49 are free to slide off of the forward ends of said track bars. When the latch member 56 is positioned within the notch 57 the knife carriage and meat holding plate will be connected together so that only sufficient relative angular movement between these two parts to compensate for variations in thickness of different pieces of meat which are being scored will be permitted. This makes it possible to raise the meat holding plate 34 along with the knife carriage, as shown in Fig. 5, by lifting upwardly on the handles 48 and yet provides enough clearance for the latch member 56 in the notch 57 so that the knives may always be forced down in the meat until the shoes 55 rest on the turn table 12 irrespective of the thickness of the meat.

It will be noted that the vertical shank 16 which forms the axis about which the turn table 12 is angularly moved is off center as respects said turn table. This provides for positioning the turn table in a squarely aligned position as respects the meat holding plate when the meat holding plate is moved to the limit of its angular movement to either side of the longitudinal center line of the base. It will be apparent that the meat holding plate and the lever arm 22 are connected together through the post 23 so that they will always move angularly the same amount in corresponding directions. Also it will be apparent that angular movement of the lever arm 22 will move the turn table 12 rotatively and that a relatively small angular movement of the lever arm 22 will impart a much greater angular movement to the turn table. When the meat holding plate 34 is in the position shown in Fig. 1, the turn table will be squarely positioned as respects the meat holding plate. If the meat holding plate, Fig. 1, is angularly moved in a clockwise direction as respects the post 23 to substantially the position indicated by dot and dash lines A in said Fig. 1, the turn table will be turned through an angle of substantially ninety degrees and will come to rest in a substantially square position as respects the meat holding plate. The turn table 12 and meat holding plate 34 will come to rest substantially square with respect to each other when the stop screws 28 and stop lugs 30 and 31 are adjusted to permit angular movement of the turn table of substantially ninety degrees. If the screws 28 and stop lugs 30 and 31 are adjusted to permit substantially less than ninety degrees movement of the turn table 12 then the turn table 12 will not be squarely positioned relative to the meat holding plate 34 when it comes to rest and the piece of meat on the turn table will be scored in two directions at less than right angles to each other, the meat being thus cut into diamond-shaped pieces instead of into square pieces. Preferably the stop lugs 30 and 31 are secured to the base 10 by screws or bolts so that they may be positioned as shown by full lines in Fig. 6 for square cutting of the meat or as shown by dot and dash lines for diamond-shaped cutting of the meat.

In the operation of this meat scoring device the meat holding plate is first raised, a piece of meat 35, Fig. 2, which is to be scored or tendered is then placed on the turn table 12, the meat holding plate is angularly moved sidewise in one direction to the limit of its movement and the knife carriage is moved to the forward end of the meat holding plate, the meat holding plate is then pressed firmly down onto the meat with the prongs 42 entering the meat and the knife carriage is moved to the end of the meat holding plate adjacent the post 23, causing the knives to make a series of parallel cuts in one direction through the meat. The meat molding plate is then raised clear of the meat, angularly moved sidewise to the opposite angular position, thereby angularly moving turn table 12, the knife carriage is drawn to the forward end of the meat holding plate 34, the plate 34 is pressed down onto the meat, and the knife carriage again moved to the rear of the meat holdinig plate, causing the knives to make another series of parallel cuts in a direction at an angle to the direction of the first series of cuts. This cuts the meat into small diamond-shaped or square pieces, tendering it and rendering it more suitable for consumption. The knives do not cut entirely through the meat but leave a thin layer of uncut meat adjacent the turn table which ties the several squares together and preserves the shape and unity of the original piece of meat.

Figure 3:
Fig. 3 is a fragmentary inverted plan view of one corner portion of a slotted and spiked plate embodied in this invention.

It will be noted that the scoring stroke of the knives is made by manually pushing downwardly and away from the operator, who stands in front of the machine. Preferably a substantial number of the pointed meat holding prongs 42 are provided on the bottom of the meat holding plate 34, see Fig. 3, and these prongs 42 are straight on their forward sides to more firmly hold the meat. A large number of these prongs are desirable to keep the piece of meat from sliding where a large number of knives are pushed slidably through the meat at one stroke. The prongs 42 also help to tender the meat. With the prongs 42 positioned as shown in Figs. 2, 3 and 5, I find that an indentation of one of the prongs 42 will be left in substantially every diamond or square of meat left by the knives.

This device is very rapid and very easy to operate, as it requires only two strokes of the knife carriage to score the meat in two directions and the turning of the turn table is very quickly and easily accomplished.

The knives 53 make a sliding cut through the meat, as differentiated from a rolling cut which would be made by rolling cutters, and this sliding cut more efficiently cuts tough and stringy meat.

The knife carriage is quickly and easily removed from the plate 34 and said plate 34 is readily removed from the base, making all parts readily accessible for cleaning.

The foregoing description and accompanying drawings clearly disclose a preferred embodiment of this invention but it will be understood that this disclosure is merely illustrative and that such changes in the device may be made as are fairly within the scope and spirit of the following claims.

I claim:

1. In a meat scoring machine of the class described, a meat supporting table; a meat holding plate movable toward and away from said meat supporting table and having a plurality of spaced apart parallel slots therein; track means extending lengthwise of said meat holding plate; a knife holding carriage mounted for longitudinal sliding movement on said track means of said meat holding plate and connected with said track means of said meat holding plate for simultaneous vertical movement therewith; two handles provided on the respective sides of said knife holding carriage providing means by which said carriage may be slidably moved longitudinally of said meat holding plate or by which said carriage and said plate may be raised and lowered together; and knives carried by said knife holding carriage operable through the slots in said meat holding plate.

2. In a meat scoring machine of the class described; a base; a meat supporting table on said base; a meat holding plate pivotally mounted on said base for movement toward and away from said meat supporting table, said meat holding plate having a plurality of spaced apart parallel slots therein; a knife holding carriage mounted for longitudinal sliding movement on said meat holding plate and connected with said meat holding plate for simultaneous swinging movement therewith; two handles provided on the respective sides of said knife holding carriage; knives carried by said knife holding carriage; and releasable latch means operatively connecting parts of said knife holding carriage for holding said knives in an operative position in which they protrude downwardly and forwardly through the slots in said meat holding plate and for releasing the part holding said knives for withdrawal of said knives from the slots in said meat holding plate.

3. In a meat scoring machine of the class described, a meat supporting table; a meat holding plate movable toward and away from said table and having a plurality of parallel slots therein; a knife holding carriage mounted for longitudinal sliding movement on said meat holding plate and connected with said meat holding plate for simultaneous swinging movement therewith; knives carried by said knife holding carriage extending forwardly and downwardly therefrom through the slots in the meat holding plate when said knife holding carriage is in operative position; and two handles connected with the respective side portions of said knife holding carriage, said handles being inclined downwardly toward the forward end of said meat holding plate whereby a downward and rearward pressure may be exerted by pushing on said carriage to simultaneously move the knives rearwardly and urge the meat holding plate toward said table.

4. In a meat scoring machine of the class described, a meat supporting table; a meat holding plate movable toward and away from said table and having a plurality of parallel slots therein; a knife holding carriage; track means extending lengthwise of said meat holding plate; guide means on said knife holding carriage slidable on said track means whereby said meat holding plate is connected with said knife holding carriage and said knife holding carriage is movably mounted on the side of said meat holding plate opposite said table; two handles on the respective sides of said knife holding carriage; meat scoring knives secured to said carriage and operable through the slots in said meat holding plate to score a piece of meat on said table; and shoe members connected with said knife holding carriage positioned to engage with said table and support the knives in close proximity to the table but clear of the table.

5. In a meat scoring machine of the class described, a base, a meat supporting turn table pivotally mounted on said base; a meat holding table pivotally connected with said base for movement toward and away from said turn table and for movement sidewise with respect to said turn table; and turn table rotating means interconnecting said turn table and said meat holding plate operative to rotatively move said turn table in response to sidewise movement of said meat holding plate relative to said turn table.

6. In a meat scoring machine of the class described, a base; a meat supporting turn table pivotally mounted adjacent one end of said base; a meat holding plate positioned above said turn table and pivotally mounted for vertical and sidewise swinging movement adjacent the other end of said base; and lever means positioned beneath said base connected with said turn table and said meat holding plate and movable in response to sidewise movement of said meat holding plate to rotatively move said turn table.

7. In a meat scoring machine of the class described, a base; a meat supporting turn table; an upright pivot member journaled in said base supporting said turn table for angular movement; a crank arm on the lower end of said pivot member; a lever member connected with said crank arm; an upright post journaled in said base and fixedly connected with said lever arm; a meat holding plate; means connecting said meat holding plate and said post adapted to move said post rotatively when said meat holding plate is moved sidewise; and pivot means providing swinging movement of said meat holding plate toward and away from said turn table.

8. In a meat scoring machine of the class described, a base; a meat supporting turn table pivotally mounted on said base; a meat holding plate positioned above said turn table and pivotally connected with said base at a point to one side of said turn table, said pivotal connection providing up and down and sidewise swinging movement of said meat holding plate, said meat holding plate having a plurality of parallel slots therein; a knife holding carriage supported on the upper side of said turn table for movement parallel to said slots; knives on said carriage extending through said slots positioned to score meat on said turn table; and turn table rotating means operatively connecting said turn table and said meat holding plate and actuated by sidewise swinging movement of said plate.

9. In a meat scoring machine of the class described, a substantially rectangualr base of inverted dish shape; a substantially horizontal meat supporting turn table rotatably mounted on said base near one end thereof stop means limiting the angular movement of said turn table to substantially ninety degrees; a meat holding plate pivotally connected with said base near the other end thereof, said meat holding plate being swingingly movable toward and away from said meat supporting turn table and being swingingly movable transversely as respects said meat supporting turn table and said meat supporting turn table having a plurality of longitudinally extending parallel slots therein; a plurality of pointed meat holding prongs on the under side of said meat holding plate; lever means connecting said meat supporting plate and said turn table for angularly moving said turn table in response to sidewise swinging movement of said meat holding plate; a knife carriage movable longitudinally of said meat holding plate; a plurality of knives secured to said carriage extending through said slots in said plate and movable across said meat supporting turn table to score meat supported thereon; and shoe means connected with said knife carriage extending below the cutting edges of said knives and providing a small clearance between the cutting edges of said knives and said turn table.

JOHN A. VORIS.